United States Patent [19]
Staacks et al.

[11] Patent Number: 5,989,485
[45] Date of Patent: Nov. 23, 1999

[54] COORDINATE THERMAL-CUTTING MACHINE WITH A MEANS FOR AUTOMATICALLY SETTING THE INITIAL HEIGHT OF A TORCH

[75] Inventors: Dieter Staacks, Dietzenbach; Karl-Heinz Schmall, Baden-Baden, both of Germany

[73] Assignee: Messer Griesheim Schweisstechnik GmbH & Co., Germany

[21] Appl. No.: 09/149,570

[22] Filed: Sep. 8, 1998

[30] Foreign Application Priority Data

Sep. 8, 1997 [DE] Germany ............................ 197 39 351

[51] Int. Cl.[6] .................................................. B23K 7/10
[52] U.S. Cl. ............................................. 266/76; 266/48
[58] Field of Search .................................. 266/48, 76, 77

[56] References Cited

U.S. PATENT DOCUMENTS

| | | | |
|---|---|---|---|
| 4,013,277 | 3/1977 | Schmitt | 266/76 |
| 4,168,822 | 9/1979 | Ogden | 266/76 |
| 4,328,049 | 5/1982 | Richardson | 266/76 |
| 4,415,795 | 11/1983 | Ross et al. | 266/76 |
| 4,773,946 | 9/1988 | Griebeler | 266/76 |

*Primary Examiner*—Scott Kastler
*Attorney, Agent, or Firm*—Connolly, Bove, Lod, & Hutz LLP

[57] ABSTRACT

The invention relates to a coordinate thermal-cutting machine with a means for automatically setting the initial height of a torch, in particular a plasma torch, above a workpiece surface. In order to achieve a fast and exact setting of the igniting distance above the workpiece surface, the torch (28) is at least partially surrounded by an inner tubular enclosure (7), which is at least partially surrounded by an outer tubular enclosure (10), bearing elements (8, 9 and 29, 30) being arranged between the tubular enclosures (7, 10) in such a way that the inner tubular enclosure (7) is at least longitudinally displaceable with the torch (28), there also being provided a position sensor which senses the longitudinal displacement and, furthermore, the inner enclosure (7) is connected to a compensation device (35) which reduces the weight of the inner enclosure (7) with the torch (28).

19 Claims, 1 Drawing Sheet

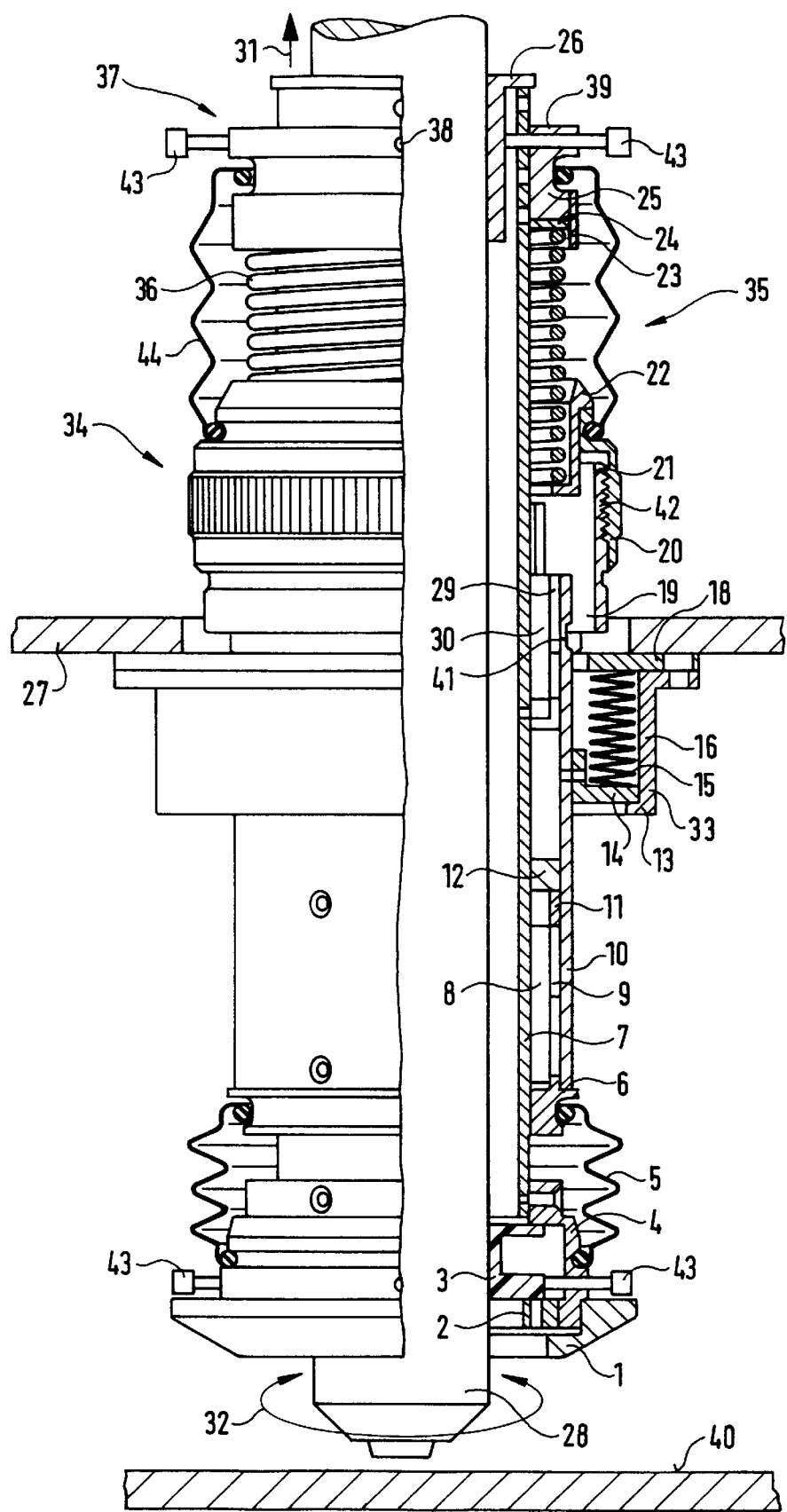

COORDINATE THERMAL-CUTTING MACHINE WITH A MEANS FOR AUTOMATICALLY SETTING THE INITIAL HEIGHT OF A TORCH

BACKGROUND OF INVENTION

The invention relates to a coordinate thermal-cutting machine with a means for automatically setting the initial height of a torch, in particular a plasma cutting torch, above a workpiece surface.

In plasma cutting, a quantity of gas with a high temperature and with a high power density is used; the plasma jet leaves the torch nozzle with such high energy that it is suitable for cutting electrically conducting metal.

"Plasma" is understood to mean a dissociated and partially ionized electrically conducting gas.

The plasma arc for cutting metallic workpieces can only be set up appropriately for the process if the correct igniting distance is maintained between the torch and the workpiece surface. Therefore, it is necessary, before switching on the ignition voltage, to set the cutting torch to an initial height with respect to the workpiece surface which allows the plasma gas to be ignited. Owing to different workpiece thicknesses and surface configurations, this position must be automatically determined in each case.

For setting the initial height of a cutting torch, use is made either of leading electromechanical sensors, which on contact with the workpiece surface emit a stop command to the torch drive, or of proximity switches or approach/analog sensors, which are used contactlessly for switching off the drive.

After igniting the plasma gas, an analog distance sensing system is then further used for distance control in the cutting process or the system switches over to arc-voltage-dependent control.

For cutting processes, until now capacitive or inductive sensors have been used predominantly for distance control. Since these sensors require an opposing workpiece area of at least the same size, they are not suitable for setting the exact initial height of the cutting torches above the workpieces if the sensor is at an edge of the workpiece. In addition, devices with which the cutting torches are protected from being destroyed in the event of a collision are known.

A known means for determining the initial height initially makes the cutting torch approach the workpiece at an adapted approach speed in such a way that it sets down on the workpiece surface. The torch drive is switched off by electrical contact between the tip of the torch and the workpiece or by evaluating the change in the driving force upon setting down. Subsequently, the cutting torch is made to return to the igniting distance by the machine controller (U.S. Pat. No. 4,795,882). In the case of the known means, damage to the cutting torch cannot be ruled out when it is set down on the workpiece. What is more, when working thin sheets, sagging occurs when the cutting torch is set down. The initial height then does not correspond to the unloaded workpiece surface, with the result that the exact igniting distance cannot be maintained. In addition, the unproductive times are increased significantly, since the cutting torch is moved at a low approach speed to the workpiece surface.

SUMMARY OF INVENTION

The object of the invention is to provide a coordinate thermal-cutting machine with a means for automatically setting the initial height of a cutting torch by means of which an exact and fast setting of the igniting distance above the workpiece surface can be achieved.

According to the invention, the torch is at least partially surrounded by an inner tubular enclosure, preferably an inner guide tube, which is at least partially surrounded by an outer tubular enclosure, preferably an outer guide tube, bearing elements being arranged between the tubular enclosures in such a way that the inner tubular enclosure is at least longitudinally displaceable with the torch, and a position sensor senses the longitudinal displacement, the inner enclosure being connected to a compensation device which reduces the weight of the torch. With the means for determining the initial distance from a workpiece surface in a machine tool, in particular a thermal-cutting machine, with respect to the torch, for example a welding or cutting torch, the torch is moved toward the workpiece surface in such a way that contact occurs there between the torch nozzle and the workpiece surface, thereby generating a switching signal. In this case, exact centering of the tool center point takes place on that ignition point above the workpiece surface which is output by the programmed machine controller. The cutting torch centrally arranged in the means according to the invention sets down on the surface of the workpiece at the approach speed, the position sensor, which generates a difference-zero signal in the initial position, generating a switching signal when there is the slightest longitudinal displacement between the inner enclosure and outer enclosure in the range of about 0.1 mm. The switching signal is fed to the machine controller or a separate torch controller or an evaluation unit, which stops the downward movement. By means of the torch drive, known per se, the means is subsequently moved with the cutting torch in the Z axis slowly upward away from the workpiece surface, until the torch in the inner enclosure has reached the starting position assumed before the longitudinal displacement and the position sensor again generates the difference-zero signal. In this position, the torch nozzle is in exact contact with the workpiece surface without workpiece sagging and/or residual axial displacement travel between the inner enclosure and outer enclosure. Subsequently, the machine controller or torch controller moves the means with the torch to the predetermined igniting distance. The inner and outer enclosures, performing a relative movement, advantageously permit retrofitting to any existing cutting-torch means, the outer enclosure being mechanically connected to the Z axis. The existing distance controls can continue to be used. In addition, the workpiece surface, determinative as the reference point or reference plane for the setting of the igniting distance, can be approached at a relatively high approach speed, since, as a result of the compensation device connected to the inner enclosure, the weight of the torch is reduced to a small residual value and therefore only low forces occur upon setting down on the workpiece.

Immediately after setting down of the cutting torch, follow-up algorithms are initiated by the switching signal of the position sensor, with the result that programmable height-function sequences of the Z axis, which can be set in a superposed form, can be controlled. The height-function sequences, for example the defined ignition height, which can be set by programming, for the ignition of the plasma gas, the hole piercing and the like, can merge one into the other by means of microchip technology, with the result that the unproductive times can be significantly reduced. This is achieved by the generated switching signal being made available directly to the controller, which controls, with virtually no time delay, the drive controlling the height-function sequences.

The fact that the cutting torch is arranged centrally in the inner enclosure and the outer enclosure is arranged concentrically with respect to the inner enclosure means that the tool center point sensed on the workpiece surface is identical to the ignition point, with the result that an exact setting of the ignition height at this point of the workpiece surface is ensured.

The fact that the bearing elements are designed as ball guides, preferably ball bushes, or as sliding bearings, means that there are virtually no tolerances between the enclosures, since the bearing elements are, to the greatest extent, free from any backlash. As a result, movements of the cutting torch upon setting down on the workpiece surface do not cause any changes in the position of the cutting torch. The cutting torch is advantageously mounted rotatably in the outer enclosure, a rotation through more than 360° being possible. This extends the use of the cutting torch. Said cutting torch can be used, for example, for cutting out holes, the rotation of the cutting torch avoiding twisting of the hose assembly.

The fact that the compensation device has a spring cup which is arranged around the inner enclosure and in which there is arranged a spring supported against a flange fastened on the inner enclosure, and the spring cup is connected to a fine-adjusting screw which is connected to the outer enclosure, means that the spring can be set exactly within wide ranges, and consequently it is possible to compensate for the weight of the torch with the inner enclosure.

The fact that the outer enclosure is connected to a housing in which a wobble plate connected to the outer enclosure is arranged in an elastically movable manner and is centrally guided on the cylindrical housing wall means that effective collision protection against forces in the longitudinal and transverse directions is achieved for the means according to the invention and the cutting torch.

On the inner enclosure there are advantageously provided adjusting bodies, in particular adjusting rings with radially movable elements, preferably set-screws, which permit a central alignment of the cutting torch in the inner enclosure. This design allows the use of an inner enclosure, the inside diameter of which is adapted to the outside diameter of the cutting torch. This makes it possible to arrange cutting torches within a wide range of diameters, suitable for practical purposes, preferably from 25 to 54 mm, in the inner enclosure and to align them centrally. This enhances the retrofitting properties, while retaining the central arrangement of the cutting torch.

The fact that the flange is formed on at least one adjusting ring and the adjusting ring is arranged axially displaceably on the inner enclosure means that the compensation for the weight of the cutting torch can also be set step by step in greater ranges.

Bellows are arranged between the outer enclosure and the inner enclosure at the lower and upper transitions. They advantageously prevent the ingress of dust and dirt into the movable parts and bearing elements.

According to an advantageous embodiment, the position sensor is designed on the basis of the differential-coil or differential-field system with active excitation, which contactlessly senses a narrow groove made on the outer side of the inner enclosure, with the result that in the normal position, without longitudinal displacement, a difference-zero signal is obtained and, when there is slight longitudinal displacement of the cutting torch, the position sensor generates a switching signal.

In the case of the means according to the invention, the torch is advantageously mounted centrally in a guide tube, which can move longitudinally displaceably in a concentrically arranged, larger guide tube by means of an easy-action bearing means, predominantly by ball cage bearings, there being arranged between the inner guide tube and the outer guide tube an electrical switching means, which generates a switching signal when there is displacement between the two tubes, it being furthermore possible for the inner guide tube with the cutting torch to set an adjustable device, which is equipped with a spring and acts against the outer guide tube, in such a weight-relieving way that, with the guide tubes arranged vertically, a virtually complete reduction of the weight of the inner guide tube and torch is made possible.

Furthermore, in the guide tube there are fitted, at the lower and upper ends, radially adjustable, annular bodies, which enclose the machine tool and with which the central alignment of the torch in the guide tube is made possible, by means of radially movable adjusting devices, preferably designed as set-screws.

What is more, the inner guide tube is designed such that it is both longitudinally displaceable and rotatable in the outer guide tube, by means of suitable bearing means, preferably ball cage bearings. The outer guide tube is equipped with a wobble plate, preferably in the region of the centers of gravity, which is held in a stable position in a housing by pre-stressed springs and, when lateral forces act on the outer tube or stronger forces act in the longitudinal direction or transverse direction on the inner tube, deflect the torch against spring force and consequently can prevent collision-induced mechanical damage to the means.

THE DRAWING

An exemplary embodiment is represented in the drawing.

DETAILED DESCRIPTION

In the drawing, a plasma cutting torch 28 is surrounded by a means 34 (illustrated schematically in a partial section) for automatically setting the initial height.

The means 34 is composed essentially of two tubular enclosures which are designed as outer tube 10 and inner tube 7. The torch 28 is aligned centrally in the inner tube 7 and the outer tube 10 is arranged concentrically with respect to the inner tube 7. Bellows 5, 44, which prevent the ingress of dirt into the intermediate space formed between the outer tube 10 and inner tube 7, are arranged at the lower and upper transitions from the outer tube 10 to the inner tube 7. Between the outer tube 10 and inner tube 7 there are two ball guides 8, 9 and 29, 30, preferably ball bushes, which permit a longitudinal displacement of the inner tube 7 with the cutting torch 28 in the direction 31 of the hose assembly (not illustrated in more detail) and a rotation 32 of the inner tube 7 with the cutting torch 28 in the outer tube by n×360°. The outer tube 10 is connected to a wobble plate 14, which is arranged in an anti-collision housing 16. The wobble plate 14 is centrally guided on the housing wall 33 of the housing 16 and can be moved elastically in the housing 16 with the outer tube 10 by means of springs 15. The anti-collision housing 16 with the termination cover 18 is connected to the torch drive (Z axis) using the mounting 27.

The inner tube 7 is fixedly positioned on the lower stop 11 with respect to the outer tube using the bearing rings 11 and 12 which are arranged between the outer tube and inner tube. The weight of the cutting torch 28, which is permanently connected to the insulating ring 3 by means of the locking ring 2 and clamping member 26 and is centered in the guide body 4, is compensated for within wide ranges by adjusting the compensation device 35. The compensation device 35 is composed essentially of a spring cup 22, which is arranged around the inner tube 7 and in which there is arranged a spring 36. The spring cup 22 is connected to the outer tube 10 by means of an adjusting screw 21, which preferably has a fine thread. For this purpose, the outer tube 10 is assigned a threaded sleeve 42. The spring 36 bears with its other end against a flange 24, which is connected to the inner tube and which is a component of a body 37.

The bodies 4 and 37 are connected to the inner tube 7 and have at least three radially movable elements 43, preferably set-screws whose length can be varied by screwing them into the bodies 4 and 37. They permit the torch 28 to be aligned centrally. The adjusting body 37 has step-by-step adjustment which is composed of an adjusting ring 39 which can be adjusted axially on the circumference of the inner tube and can be locked by means of openings 38 which are arranged spaced apart in the outer surface of the inner tube. By means of the step-by-step adjustment 38, 39 and fine-adjusting threaded ring 20 as well as spring 36, the compensation device 35 can be adjusted to the weight of the cutting torch 28. As a result, the force which is produced when the tip of the torch is set down on the workpiece surface 40 is minimized.

The cutting torch 28 is moved by the means 34 from the upper position of the Z axis in the direction of the workpiece surface 40. When setting down the tip of the torch, the cutting torch 28 is displaced longitudinally in direction 31 with the inner tube 7 in the outer tube 10. In the region of the fine adjustment 20 there is the electronic position sensor, in the annular chamber 19. When there is a relative displacement between inner tube 7 and outer tube 10, the switching signal is generated by means of a contactless sensing of a narrow marking 41 made on the outer side of the inner tube 7 by the position sensor. The position sensor is preferably designed on the basis of a differential-coil or differential-field system with active excitation. Even when there is very slight longitudinal displacement of about 0.1 mm of the inner tube 7, the position sensor emits a switching signal.

In the evaluation unit (not shown in any more detail here), this signal is conditioned in such a way that it is used to switch off the drive and/or immediately initiate a return movement of the drive, which displaces the outer tube 10 until the electronic position sensor again emits the difference-zero signal.

This position is the best possible initial position, from which the ignition height is set. Virtually at the same time, the controller emits the signal "initial height reached" to the downstream controller group and initiates the further movement of the cutting torch to the position "ignition height".

The special collision protection acts when there are unforeseen lateral or longitudinally directed forces acting on the torch or on the means 34. The outer tube is deflected either to swivel out laterally or to move upward, with the result that in the housing 16 the springs 15 are correspondingly subjected to compressive forces via the wobble plate 14 and the wobble plate 14 can make way toward the cover plate 18.

As an option, this may also generate a special collision switching signal, which moves the torch out of the danger zone by means of the drive.

The degree of freedom "rotation through more than 360°" makes it possible for the means 34 to be used for extended application areas in plasma coordinate thermal-cutting machines.

We claim:

1. A coordinate thermal-cutting machine with a means for automatically setting the initial height of a torch, above a workpiece surface, wherein the torch is at least partially surrounded by an inner tubular enclosure, which is at least partially surrounded by an outer tubular enclosure, wherein bearing elements are arranged between the tubular enclosures in such a way that the inner tubular enclosure is at least longitudinally displaceable with the torch, wherein there is provided a position sensor which senses the longitudinal displacement and wherein the inner enclosure is connected to a compensation device which reduces the weight of the inner enclosure with the torch.

2. The coordinate thermal-cutting machine as claimed in claim 1, wherein the torch is arranged centrally in the inner enclosure and the outer enclosure is arranged concentrically with respect to the inner enclosure.

3. The coordinate thermal-cutting machine as claimed in claim 1, wherein the bearing elements are ball guides.

4. The coordinate thermal-cutting machine as claimed in claim 1, wherein the bearing elements are sliding bearings.

5. The coordinate thermal-cutting machine as claimed in claim 1, wherein the torch is rotatable in the outer enclosure.

6. The coordinate thermal-cutting machine as claimed in claim 1, wherein the compensation device has a spring cup which is arranged around the inner enclosure and in which there is arranged a spring supported against a flange fastened on the inner enclosure.

7. The coordinate thermal-cutting machine as claimed in claim 1, wherein the spring cup is connected to a fine-adjusting screw, which is connected to the outer enclosure.

8. The coordinate thermal-cutting machine as claimed in claim 1, wherein the outer enclosure is connected to a housing in which a wobble plate, connected to the outer enclosure, is arranged in an elastically movable manner and is centrally guided on the cylindrical housing wall.

9. The coordinate thermal-cutting machine as claimed in claim 1, wherein on the inner enclosure there are provided bodies with radially movable elements, which permit a central alignment of the torch in the inner enclosure.

10. The coordinate thermal-cutting machine as claimed in claim 1, wherein at least one body is designed as an adjusting ring and the elements are set-screws.

11. The coordinate thermal-cutting machine as claimed in claim 1, wherein the flange is formed on at least one adjusting ring and the adjusting ring is arranged axially displaceably and fixably on the inner enclosure.

12. The coordinate thermal-cutting machine as claimed in claim 1, wherein bellows are arranged between the outer enclosure and the inner enclosure at the lower and upper transitions which bellows prevent the ingress of dust and dirt into the movable parts and bearing elements.

13. The coordinate thermal-cutting machine as claimed in claim 1, wherein the position sensor is contactless approximation electronic sensor with active excitation, which contactlessly senses a narrow marking made on the outer side of the inner enclosure, with the result that in the normal position, without longitudinal displacement, a difference-zero signal is obtained and, when there is slight longitudinal displacement, the position sensor generates a switching signal.

14. The coordinate thermal-cutting machine as claimed in claim 13, wherein the torch is arranged centrally in the inner enclosure and the outer enclosure is arranged concentrically with respect to the inner enclosure, the torch is rotatable in the outer enclosure, the compensation device has a spring cup which is arranged around the inner enclosure and in which there is arranged a spring supported against a flange fastened on the inner enclosure, the spring cup is connected to a fine-adjusting screw, which is connected to the outer enclosure, the outer enclosure is connected to a housing in which a wobble plate, connected to the outer enclosure, is arranged in an elastically movable manner and is centrally guided on the cylindrical housing wall, on the inner enclosure there are provided bodies with radially movable elements, which permit a central alignment of the torch in the inner enclosure, at least one body is an adjusting ring and the elements are set-screws, the flange is formed on at least one adjusting ring and the adjusting ring is arranged axially displaceably and fixably on the inner enclosure, bellows are arranged between the outer enclosure and the inner enclosure at the lower and upper transitions which bellows prevent the ingress of dust and dirt into the movable parts and bearing elements.

15. The coordinate thermal-cutting machine as claimed in claim 14, wherein the bearing elements are sliding bearings.

16. The coordinate thermal-cutting machine as claimed in claim 14, wherein the bearing elements are ball guides.

17. The coordinate thermal-cutting machine as claimed in claim 16 wherein the ball guides are ball bushes.

18. The coordinate thermal-cutting machine as claimed in claim 13, wherein the sensor is a differential-coil system.

19. The coordinate thermal-cutting machine as claimed in claim 13, wherein the sensor is a differential-field system.

* * * * *